US012217902B2

(12) United States Patent
Saito et al.

(10) Patent No.: US 12,217,902 B2
(45) Date of Patent: Feb. 4, 2025

(54) COIL COMPONENT

(71) Applicant: TDK CORPORATION, Tokyo (JP)

(72) Inventors: Masataro Saito, Tokyo (JP); Hokuto Eda, Tokyo (JP); Kohei Takahashi, Tokyo (JP); Takamasa Iwasaki, Tokyo (JP); Masazumi Arata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 675 days.

(21) Appl. No.: 17/545,629

(22) Filed: Dec. 8, 2021

(65) Prior Publication Data

US 2022/0189682 A1 Jun. 16, 2022

(30) Foreign Application Priority Data

Dec. 11, 2020 (JP) ................................. 2020-205811

(51) Int. Cl.
*H01F 27/32* (2006.01)
*H01F 17/04* (2006.01)
*H01F 27/29* (2006.01)

(52) U.S. Cl.
CPC ........... *H01F 27/292* (2013.01); *H01F 17/04* (2013.01); *H01F 27/324* (2013.01); *H01F 2017/048* (2013.01)

(58) Field of Classification Search
CPC ...... H01F 27/292; H01F 17/04; H01F 27/324; H01F 2017/048; H01F 17/0006; H01F 27/2804; H01F 27/26; H01F 27/29
See application file for complete search history.

(56) References Cited

U.S. PATENT DOCUMENTS

2019/0013145 A1* 1/2019 Ohkubo .................. H01F 17/04
2021/0193369 A1* 6/2021 Saito ........................ H01F 27/32
2021/0327637 A1* 10/2021 Eda ...................... H01F 17/0013
2023/0119388 A1* 4/2023 Otsuka ................ H01F 27/2847
336/196

FOREIGN PATENT DOCUMENTS

JP 2016-103591 A 6/2016
JP 2020-047938 A 3/2020

* cited by examiner

*Primary Examiner* — Tuyen T Nguyen
(74) *Attorney, Agent, or Firm* — Oliff PLC

(57) ABSTRACT

By overlapping the protruding portion of the first insulator and the protruding portion of the second insulator via the protruding portion of the substrate, the DC superposition characteristic of the coil component is improved.

5 Claims, 9 Drawing Sheets

COIL COMPONENT

CROSS-REFERENCE TO RELATED APPLICATIONS

This application is based upon and claims the benefit of priority from Japanese Patent Application No. 2020-205811, filed on 11 Dec. 2020, the entire contents of which are incorporated herein by reference.

TECHNICAL FIELD

The present disclosure relates to a coil component.

BACKGROUND

Conventionally, a coil component such as a surface-mounted planar coil element is widely used in the electrical products such as consumer devices or the industrial devices. Particularly in the small portable devices, according to the enhancement of functions, it is necessary to obtain a plurality of voltages from a single power source in order to drive each device. Therefore, the surface-mounted planar coil element is also used for such a power supply application.

Such a coil component is disclosed in, for example, Japanese Patent Laying-Open No. 47938 2020 (Patent Document 1). In the coil component disclosed in Patent Document 1, planar spiral planar coils are provided on the upper and lower surfaces of a nonmagnetic substrate, respectively, and the planar coils are connected to each other by a through-hole conductor provided so as to penetrate the substrate in a magnetic core portion of the planar coil. In addition, in the coil component disclosed in Patent Document 1, an insulator is provided in the same layer as the layer that the planar coil is formed, and the insulator achieves insulation between the planar coil and the coating resin and insulation between the winding portions. Further, in the coil component disclosed in Patent Document 1, a part of the nonmagnetic substrate is exposed on the side surface of the element body.

SUMMARY

The inventors have repeatedly studied the exposure mode on the side surface of the element body, and have found a new technique improving the DC superposition characteristics by the exposure mode on the side surface of the element body.

According to the present disclosure, there is provided a coil component having improved DC superposition characteristics.

A coil component according to one aspect of the present disclosure includes an element body including a magnetic material and having an upper surface and a lower surface parallel to each other; a substrate disposed in the element body and extending parallel to the upper surface and the lower surface; a first coil body disposed in the element body and formed on an upper surface of the substrate, the first coil body has a first planar coil and a first insulator, the first planar coil includes a first connection end, a first extraction end, and a first turn portion connecting the first connection end and the first extraction end, the first insulator covers the first planar coil in the same layer as the layer that the first planar coil is formed; a second coil body disposed in the element body and formed on a lower surface of the substrate, the second coil body has a second planar coil and a second insulator, the second planar coil includes a second connection end connected to the first connection end of the first planar coil via the substrate, a second extraction end, and a second turn portion connecting the second connection end and the second extraction end, the second insulator covers the second planar coil in the same layer as the layer that the second planar coil is formed; a pair of terminal electrodes provided on surfaces of the element body, the pair of terminal electrodes respectively connected to the first extraction end of the first planar coil and the second extraction end of the second planar coil; wherein the substrate has an exposed substrate portion exposed from a first side surface connecting the upper surface and the lower surface of the element body, wherein the first insulator has a first exposed insulator portion exposed from the first side surface of the element body and overlaps the exposed substrate portion on the first side surface, and wherein the second insulator has a second exposed insulator portion exposed from the first side surface of the element body and overlaps the first exposed insulator portion on the first side surface via the exposed substrate portion.

The inventors have newly found that the DC superposition characteristics of the coil component are improved in a case where the first exposed insulator portion and the second exposed insulator portion overlapping with each other via the exposed substrate portion are exposed on the side surface of the element body.

In the coil component according to another aspect, the first coil body has a seed pattern formed on the upper surface of the substrate and a plated portion plated and grown on the seed pattern, and the seed pattern of the first coil body is exposed from the first side surface of the element body between the exposed substrate portion and the first exposed insulator portion.

In the coil component according to another aspect, the second coil body has a seed pattern formed on the lower surface of the substrate and a plated portion plated and grown on the seed pattern, and wherein the seed pattern of the second coil body is exposed from the first side surface of the element body between the exposed substrate portion and the second exposed insulator portion.

In the coil component according to another aspect, the exposed substrate portion, the first exposed insulator portion, and the second exposed insulator portion are exposed at a position where a distance between the first side surface and the first coil body is shortest.

In the coil component according to another aspect, the element body has an second side surface opposed to the first side surface, and the exposed substrate portion, the first exposed insulator portion, and the second exposed insulator portion are exposed on the second side surface at positions corresponding to positions where the exposed substrate portion, the first exposed insulator portion, and the second exposed insulator portion are exposed on the first side surface with respect to a direction that the first side surface and the second side surface are opposed.

DETAILED DESCRIPTION

Figure 1:
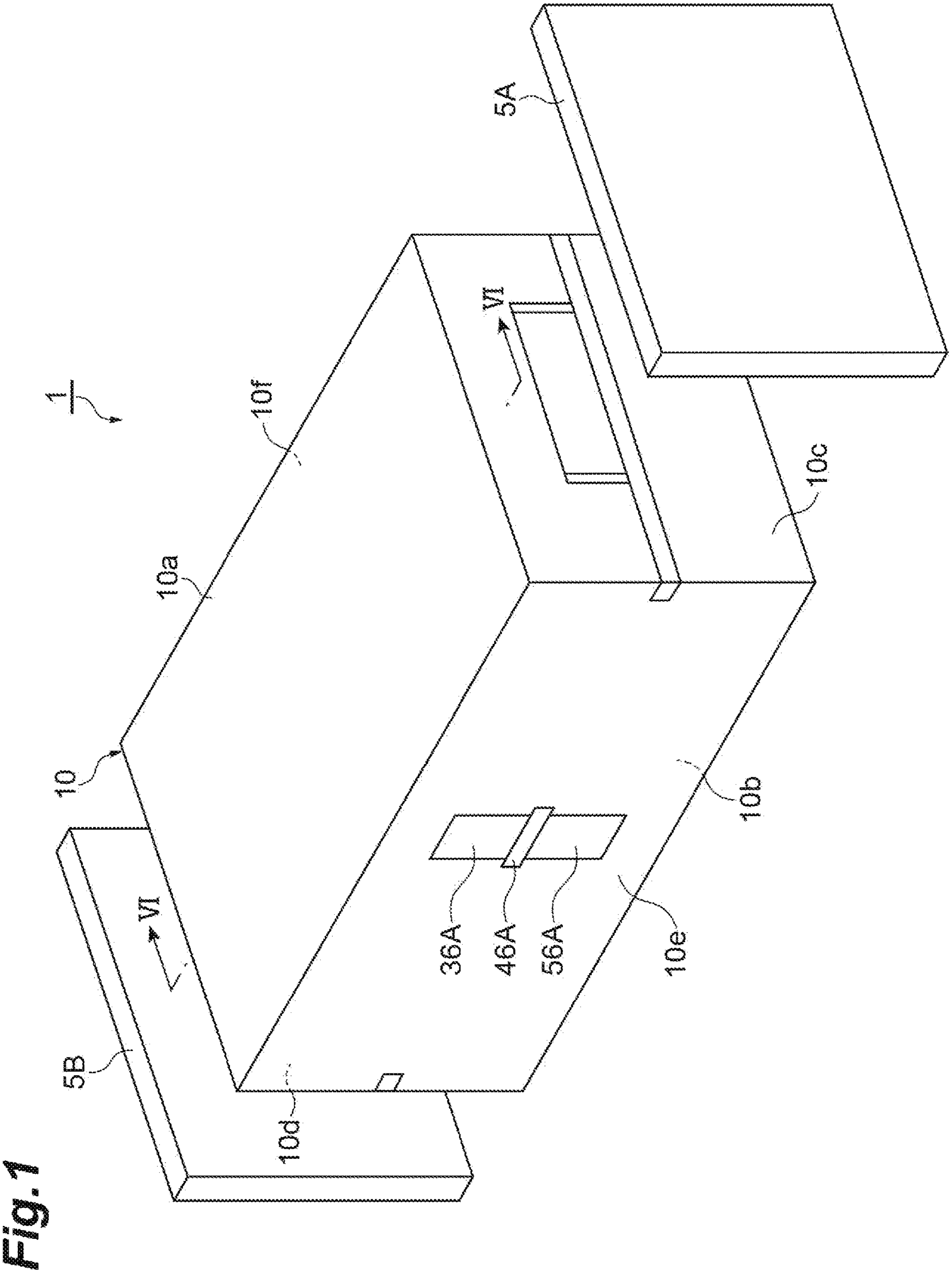
FIG. 1 is a schematic perspective view showing the coil component according to one embodiment.
Figure 2:
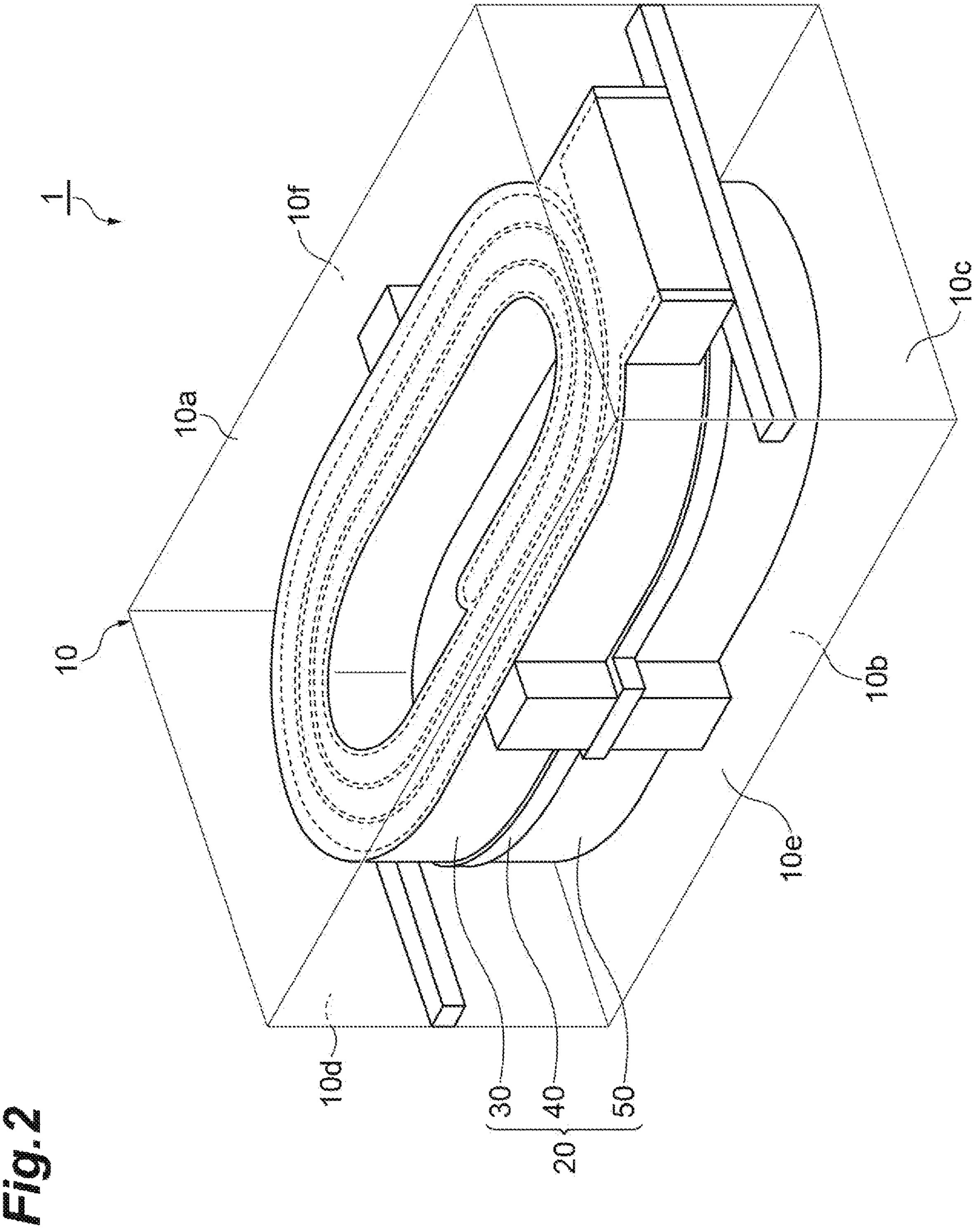
FIG. 2 shows the internal configuration of the element body of the coil component shown in FIG. 1.

Hereinafter, various embodiments and examples will be described with reference to the drawings. In the drawings, the same or corresponding portions are denoted by the same reference numerals, and redundant description thereof will be omitted.

As shown in FIG. 1, the coil component 1 according to one embodiment has a rectangular parallelepiped outer shape. As an example, the coil component 1 may be designed to have a long side of 1.2 mm, a short side of 1.0 min, and a height of 0.5 mm. Alternatively, as another example, the coil component 1 may be designed to have a long side of 2.0 mm, a short side of 1.2 mm, and a height of 0.6 mm.

The coil component 1 includes a pair of terminal electrodes 5A and 5B, an element body 10, and a coil portion 20 embedded in the element body 10.

The element body 10 has a rectangular parallelepiped outer shape and has six surfaces 10*a* to 10*f*. Among the surfaces 10*a* to 10*f* of the element body 10, the upper surface 10*a* and the lower surface 10*b* are parallel to each other, the end surface 10*c* and the end surface 10*d* are parallel to each other, and the side surface 10*e* and the side surface 10*f* are parallel to each other. The pair of terminal electrodes 5A and 5B are provided on the end surfaces 10*c* and 10*d* of the element body 10, respectively.

The element body 10 is made of a magnetic material. In the present embodiment, the element body 10 is made of a metal magnetic powder-containing resin, which is one kind of magnetic material. The metal magnetic powder-containing resin is a binding powder in which metal magnetic powder is bound by a binder resin. The metal magnetic powder may be configured of, for example, an iron-nickel alloy (a Permalloy alloy), carbonyl iron, an amorphous or crystalline FeSiCr-based alloy, Sendust, or the like. The binder resin is, for example, a thermosetting epoxy resin. In the present embodiment, a content of the metal magnetic powder in the binder powder is 80 to 92 vol % in percentage by volume and 95 to 99 wt % in percentage by mass. From the viewpoint of magnetic properties, the content of the metal magnetic powder in the binder powder may be 85 to 92 vol % in percentage by volume and 97 to 99 wt % in percentage by mass.

The coil portion 20 is configured to be provided with a first coil body 30, a substrate 40, and a second coil body 50. Specifically, the first coil body 30 is provided on an upper surface 40*a* of the substrate 40 positioned on the upper surface side of the element body 10 and the second coil body 50 is provided on a lower surface 40*b* of the substrate 40 positioned on the lower surface side of the element body 10, In the present embodiment, the pattern shape of the first coil body 30 viewed from the upper surface 40*a* side of the substrate 40 is the same as the pattern shape of the second coil body 50 viewed from the lower surface 40*b* side of the substrate 40.

Figure 3:
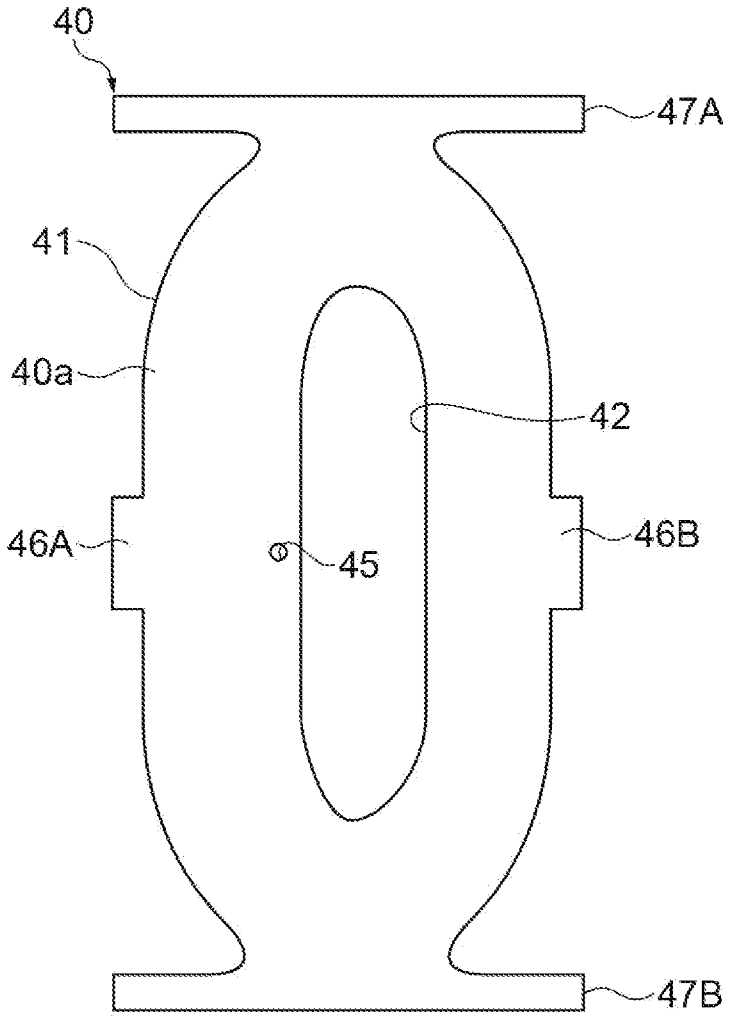
FIG. 3 is a plan view showing the substrate of the coil component shown in FIG. 1.

The substrate 40 is a plate-shaped member extending in parallel to the upper surface 10*a* and the lower surface 10*b* of the element body 10. As shown in FIG. 3, the substrate 40 has an elliptical ring-shaped coil forming portion 41 extending along the long side direction of the element body 10, a pair of protruding portions 46A and 46B (exposed substrate portions) respectively extending from the coil forming portion 41 to the side surfaces 10*e* and 10*f* of the element body 10 and exposed from the side surfaces 10*e* and 10*f*, and a pair of frame portions 47A and 47B extending along the short side direction of the element body 10 and sandwiching the coil forming portion 41 from both sides. In addition, the coil forming portion 41 is provided with a circular through hole 45 in an edge portion of an oval opening 42. The through hole 45 is filled with a via conductor, and an inner end portion 32*b* of the first planar coil 32 and an inner end portion 52*b* of the second planar coil 52, which will be described later, are electrically connected to each other.

A substrate with a plate thickness of 60 μm which a glass cloth is impregnated with cyanate resin (Bismaleimide Triazine (BT) resin: registered trademark) can be used as the substrate 40. Polyimide, aramid, and so on can be used besides the BT resin. Ceramic or glass can also be used as a material of the substrate 40. A material of the substrate 40 may be a mass-produced printed board material. Particularly, a material of the substrate 40 may be a resin material used for a BT printed board, an FR4 printed board, or an FR5 printed board.

Figure 4:
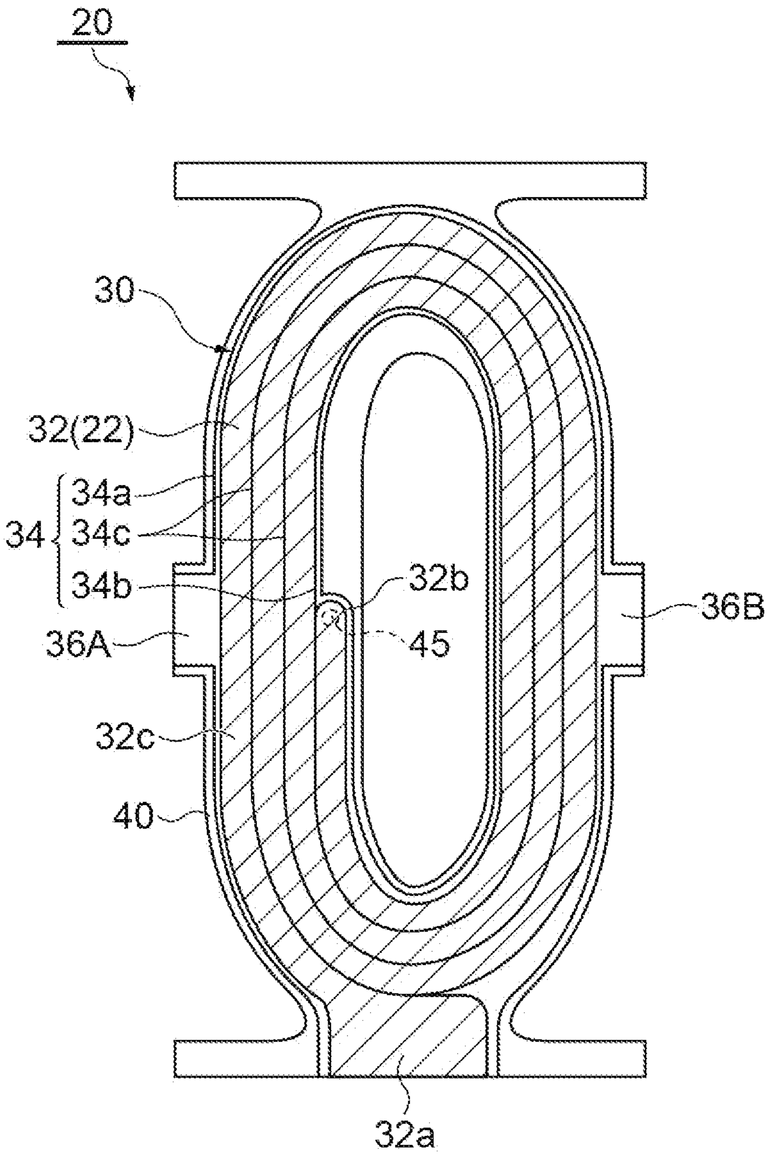
FIG. 4 is a plan view showing the first coil body provided on the upper surface of the substrate.

The first coil body 30 is provided on the upper surface 40*a* of the substrate 40 in the coil forming portion 41. As shown in FIG. 4, the first coil body 30 is configured to be provided with a first planar coil 32 constituting a part of a coil 22 (inner conductor) of the coil component 1 and a first insulator 34.

The first planar coil 32 is a substantially oval spiral air core coil wound around the opening 42 of the coil forming portion 41 in the same layer on the upper surface 40*a* of the substrate 40. The number of turns of the first planar coil 32 may be one or a plurality of turns. In the present embodiment, the number of turns of the first planar coil 32 is three to four. The first planar coil 32 has an outside end portion 32*a* (first extracting end portion), an inside end portion 32*b* (first connection end portion), and a first turn portion 32*c* interconnecting the outside end portion 32*a* and the inside end portion 32*b*. The outside end portion 32*a* is provided so as to be exposed from the end surface 10*c* of the element body 10 and connected to the terminal electrode 5A. The inside end portion 32*h* is provided in the region that covers the through hole 45 of the substrate 40 when viewed from the thickness direction of the substrate 40 and has a circular shape. The first planar coil 32 is made of, for example, Cu and can be formed by electrolytic plating.

The first insulator 34 is provided on the upper surface 40*a* of the substrate 40 and is a thick film resist patterned by known photolithography. The first insulator 34 defines the growth region of the first planar coil 32 and covers the first planar coil 32 in the same layer as the layer where the first planar coil 32 is formed. In the present embodiment, the first insulator 34 includes an outer wall 34*a* and an inner wall 34*b* defining the contour of the first planar coil 32, a partition wall 34*c* separating the inside and outside turns of the first turn portion 32*c* of the first planar coil 32. The first insulator 34 is made of, for example, an epoxy resin.

The first insulator 34 further includes a pair of protruding portions 36A and 36B. The protruding portions 36A and 36B extend so as to overlap the protruding portions 46A and 46B of the substrate 40, and are exposed from the side surfaces

10*e* and 10*f* of the element body 10, respectively. In the present embodiment, each of the protruding portions 36A and 36B has a rectangular cross-sectional shape orthogonal to the extending direction and a rectangular end surface shape.

The first planar coil 32 is plated and grown in a growth region defined by the first insulator 34. The first planar coil 32 includes a seed pattern 32*d* patterned on the upper surface 40*a* of the substrate 40 and a plated portion 32*e* grown on the seed pattern 32*d*.

Figure 5:
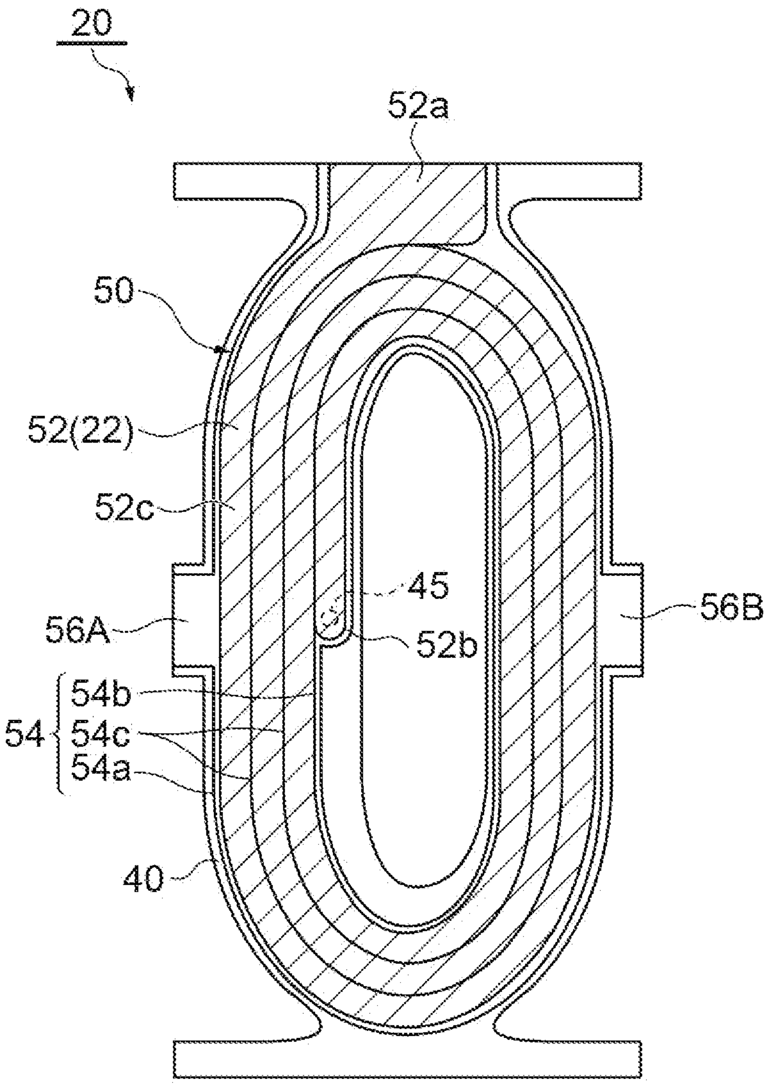
FIG. 5 is a plan view showing the second coil body provided on the lower surface of the substrate.
Figure 6:
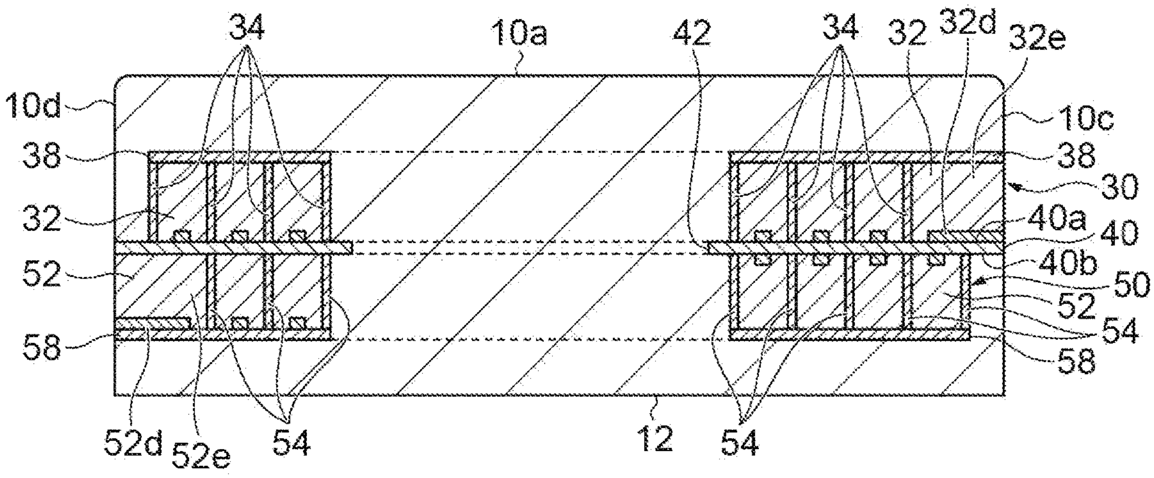
FIG. 6 is a cross-sectional view taken along line VI-VI of the element body shown in FIG. 1.

As shown in FIG. 5, the first coil body 30 further includes a protective film 38 integrally covering the first planar coil 32 and the first insulator 34 from the upper surface 10*a* side of the element body 10. The protective film 38 is made of, for example, an epoxy resin. The protective film 38 enhances the insulation between the first planar coil 32 and the metal magnetic powder contained in the element body 10.

The second coil body 50 is provided on the lower surface 40*b* of the substrate 40 in the coil forming portion 41. As shown in FIG. 5, the second coil body 50 is configured to be provided with a second planar coil 52 constituting a part of the coil 22 of the coil component 1, a second insulator 54.

The second planar coil 52 is a substantially oval spiral air core coil wound around the opening 42 of the coil forming portion 41 in the same layer on the lower surface 40*b* of the substrate 40. The number of turns of the second planar coil 52 may be one or a plurality of turns. In the present embodiment, the number of turns of the second planar coil 52 is three to four. The second planar coil 52 has an outside end portion 52*a* (second extracting end portion), an inside end portion 52*b* (second connection end portion), and a second turn portion 52*c* interconnecting the outside end portion 52*a* and the inside end portion 52*b*. The outer end portion 52*a* is provided so as to be exposed from the end surface 10*d* of the element body 10 and connected to the terminal electrode 5B. The inside end portion 52*b* is provided in the region that covers the through hole 45 of the substrate 40 when viewed from the thickness direction of the substrate 40 and has a circular shape. The second planar coil 52 is made of, for example, Cu and can be formed by electrolytic plating.

The second insulator 54 is provided on the lower surface 40*b* of the substrate 40 and is a thick film resist patterned by known photolithography. The second insulator 54 defines the growth region of the second planar coil 52 and covers the second planar coil 52 in the same layer as the layer where the second planar coil 52 is formed. In the present embodiment, the second insulator 54 includes an outer wall 54*a* and an inner wall 54*b* defining the contour of the second planar coil 52, a partition wall 54*c* separating the inside and outside turns of the second turn portion 52*c* of the second planar coil 52. The second insulator 54 is made of, for example, an epoxy resin.

The second insulator 54 further includes a pair of protruding portions 56A and 56D. The protruding portions 56A and 56B extend so as to overlap the protruding portions 46A and 46B of the substrate 40, and are exposed from the side surfaces 10*e* and 10*f* of the element body 10, respectively. In the present embodiment, each of the protruding portions 56A and 56D has a rectangular cross-sectional shape orthogonal to the extending direction and a rectangular end surface shape.

The second planar coil 52 is plated and grown in a growth region defined by the first insulator 54 in the same manner as the first planar coil 32. The second planar coil 52 includes a seed pattern 52*d* patterned on the lower surface 40*b* of the substrate 40 and a plated portion 52*e* grown on the seed pattern 52*d*.

As shown in FIG. 5, the second coil body 50 further includes a protective film 58 integrally covering the second planar coil 52 and the second insulator 54 from the lower surface 10*b* side of the element body 10. The protective film 58 is made of, for example, an epoxy resin. The protective film 58 enhances the insulation between the second planar coil 52 and the metal magnetic powder contained in the element body 10.

The respective inside end portions 32*b* and 52*b* of the first planar coil 32 provided on the upper surface 40*a* of the substrate 40 and the second planar coil 52 provided on the lower surface 40*b* of the substrate 40 are interconnected via the via conductor in the through hole 45 penetrating the substrate 40 in the thickness direction. In the present embodiment, the first planar coil 32, the second planar coil 52, and the via conductor constitute the air core coil 22 around the opening 42 of the substrate 40. The coil 22 has a coil axis parallel to the thickness direction of the substrate 40 (that is, the direction in which the upper surface 10*a* and the lower surface 10*b* face each other).

The first planar coil 32 and the second planar coil 52 are wound such that electric currents flow in the same direction (that is, the same circumferential direction when the substrate 40 is viewed from the thickness direction) when a voltage is applied between both end portions of the coil 22 (that is, the outside end portion 32*a* of the first planar coil 32 and the outside end portion 52*a* of the second planar coil 52). In the present embodiment, the first planar coil 32 has a clockwise circumferential direction from the outside end portion 32*a* to the inside end portion 32*b* as shown in FIG. 3 and the second planar coil 52 has a clockwise circumferential direction from the inside end portion 52*b* to the outside end portion 52*a* as shown in FIG. 5. Electric currents flow in the same direction through the first planar coil 32 and the second planar coil 52, and thus generated magnetic fluxes are superposed and reinforce each other.

Figure 7:
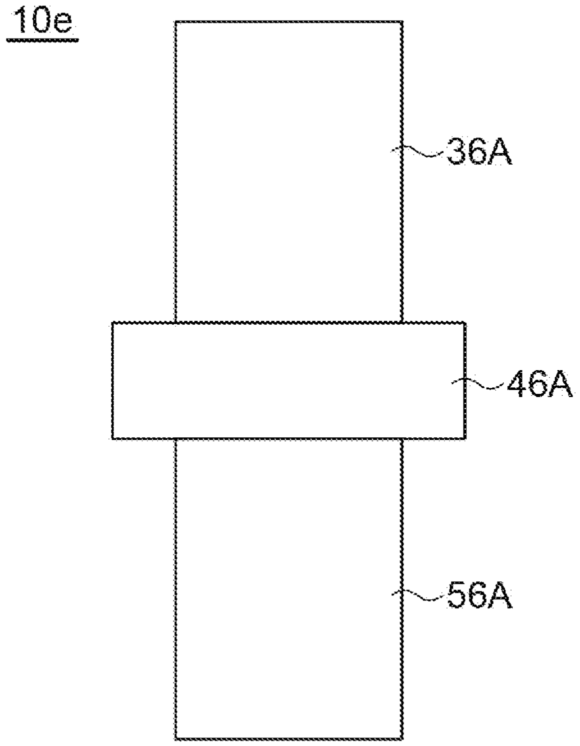
FIG. 7 shows the exposure mode on the side surface of the element body of the coil component shown in FIG. 1.

As described above, in the coil component 1, the protruding portions 46A and 46B of the substrate 40, the protruding portions 36A and 36B of the first insulator 34, and the protruding portions 56A and 56B of the second insulator 54 are exposed on the side surfaces 10*e* and 10*f* of the element body 10, respectively. More specifically, the protruding portion 46A (exposed substrate portion) of the substrate 40, the protruding portion 36A (first exposed insulator portion) of the first insulator 34, and the protruding portion 56A (second exposed insulator portion) of the second insulator 54 are exposed on the side surface 10*e* (first side surface) of the element body 10, and the protruding portion 46B (exposed substrate portion) of the substrate 40, the protruding portion 36B (first exposed insulator portion) of the first insulator 34, and the protruding portion 56B (second exposed insulator portion) of the second insulator 54 are exposed on the side surface 10*f* (second side surface) of the element body 10. FIG. 7 shows the exposed configuration on the side surface 10*e* of the element body 10. The exposed configuration on the side surface 10*f* of the element body 10 is also the same as that on the side surface 10*e*, and thus the description thereof will be omitted.

As shown in FIG. 7, the protruding portion 36A of the first insulator 34 and the protruding portion 56A of the second insulator 54 overlap each other via the protruding portion 46A of the substrate 40. In the present embodiment, the protruding portion 36A of the first insulator 34 and the protruding portion 56A of the second insulator 54 have the same end surface dimension, and entirely overlap with each other via the protruding portion 46A of the substrate 40.

Figure 8:
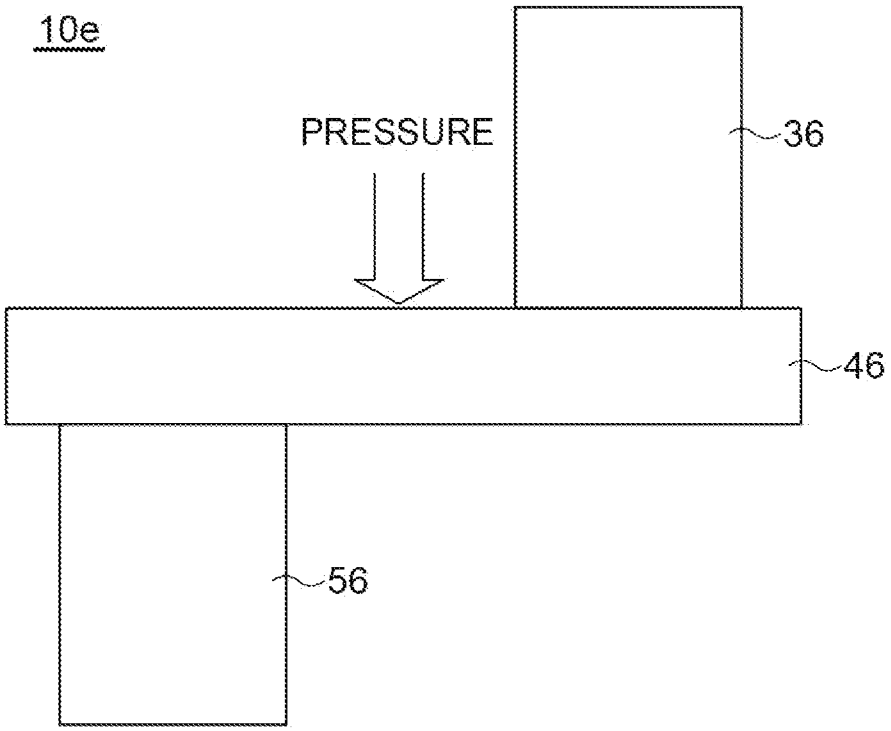
FIG. 8 shows the exposure mode according to the prior art.

FIG. 8 shows an exposed configuration on the side surface of the element body according to the conventional art, in which the protruding portion 36A of the first insulator 34 and the protruding portion 56A of the second insulator 54 are separated from each other and do not overlap at all. The inventors have found that it is difficult to further improve the DC superposition characteristics when the protruding portion 36A of the first insulator 34 and the protruding portion 56A of the second insulator 54 are separated from each other as shown in FIG. 8. In addition, it has been found that it is difficult to achieve high pressure resistance to the pressure in the thickness direction applied to the protruding portion 46A of the substrate 40 in the region between the protruding portion 36A of the first insulator 34 and the protruding portion 56A of the second insulator 54.

In the coil component 1, as shown in FIG. 7, the protruding portion 36A of the first insulator 34 and the protruding portion 56A of the second insulator 54 are overlapped with each other via the protruding portion 46A of the substrate 40, thereby improving the DC superposition characteristics. The protruding portion 36A of the first insulator 34 and the protruding portion 56A of the second insulator 54 do not necessarily completely overlap each other, and may partially overlap each other.

In the coil component 1, also in the side surface 10*f* opposed to the side surface 10*e*, the protruding portion 36B of the first insulator 34 and the protruding portion 56B of the second insulator 54 overlap with each other via the protruding portion 46B of the substrate 40 at a position corresponding to the position on the side surface 10*e*.

In the coil component 1, the first planar coil 32 and the second planar coil 52 have elliptical shapes, and the first planar coil 32 and the second planar coil 52 have the shortest distance from the side surfaces 10*e* and 10*f* at the center position of the side surfaces 10*e* and 10*f* of the element body 10. Since this portion has a small magnetic volume in the element body 10 and is likely to cause magnetic flux saturation, the DC superposition characteristics can be more effectively improved by arranging the protruding portion 36A of the first insulator 34, the protruding portion 56A of the second insulator 54, and the protruding portion 46A of the substrate 40 at this position.

Figure 9:
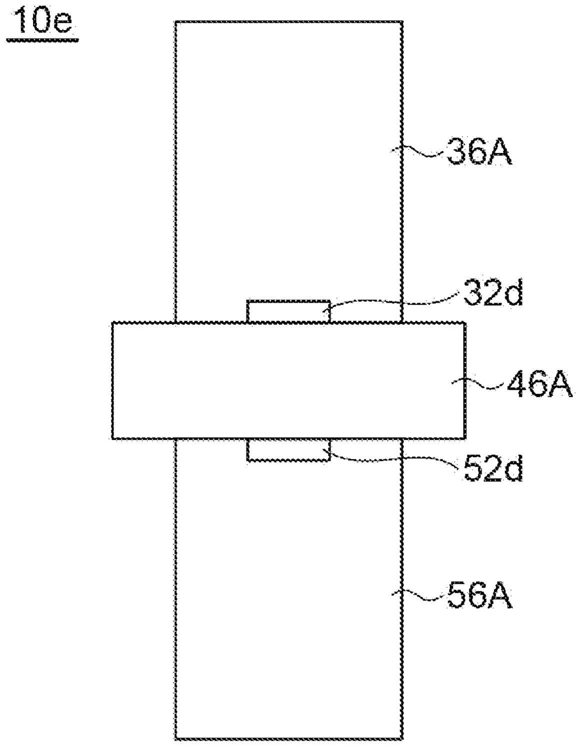
FIG. 9 shows the exposure mode different from that shown in FIG. 7.

As shown in FIG. 9, the seed pattern 32*d* of the first planar coil 32 and the seed pattern 52*d* of the second planar coil 52 may be extended to the side surfaces 10*e* and 10*f* of the element body 10 and exposed from the side surfaces 10*e* and 10*f* of the element body 10. Any one of the seed pattern 32*d* of the first planar coil 32 and the seed pattern 52*d* of the second planar coil 52 may be exposed from the side surfaces 10*e* and 10*f* of the element body 10.

What is claimed is:

1. A coil component comprising:

an element body including a magnetic material and having an upper surface and a lower surface parallel to each other;

a substrate disposed in the element body and extending parallel to the upper surface and the lower surface;

a first coil body disposed in the element body and formed on an upper surface of the substrate, the first coil body has a first planar coil and a first insulator, the first planar coil includes a first connection end, a first extraction end, and a first turn portion connecting the first connection end and the first extraction end, the first insulator covers the first planar coil in the same layer as the layer that the first planar coil is formed;

a second coil body disposed in the element body and formed on a lower surface of the substrate, the second coil body has a second planar coil and a second insulator, the second planar coil includes a second connection end connected to the first connection end of the first planar coil via the substrate, a second extraction end, and a second turn portion connecting the second connection end and the second extraction end, the second insulator covers the second planar coil in the same layer as the layer that the second planar coil is formed;

a pair of terminal electrodes provided on surfaces of the element body, the pair of terminal electrodes respectively connected to the first extraction end of the first planar coil and the second extraction end of the second planar coil;

wherein the substrate has an exposed substrate portion exposed from a first side surface connecting the upper surface and the lower surface of the element body, wherein the first insulator has a first exposed insulator portion exposed from the first side surface of the element body and overlaps the exposed substrate portion on the first side surface, and wherein the second insulator has a second exposed insulator portion exposed from the first side surface of the element body and overlaps the first exposed insulator portion on the first side surface via the exposed substrate portion.

2. The coil component according to claim 1, wherein the first coil body has a seed pattern formed on the upper surface of the substrate and a plated portion plated and grown on the seed pattern, and wherein the seed pattern of the first coil body is exposed from the first side surface of the element body between the exposed substrate portion and the first exposed insulator portion.

3. The coil component according to claim 1, the second coil body has a seed pattern formed on the lower surface of the substrate and a plated portion plated and grown on the seed pattern, and wherein the seed pattern of the second coil body is exposed from the first side surface of the element body between the exposed substrate portion and the second exposed insulator portion.

4. The coil component according to claim 1, wherein the exposed substrate portion, the first exposed insulator portion, and the second exposed insulator portion are exposed at a position where a distance between the first side surface and the first coil body is shortest.

5. The coil component according to claim 1, wherein the element body has an second side surface opposed to the first side surface, and the exposed substrate portion, the first exposed insulator portion, and the second exposed insulator portion are exposed on the second side surface at positions corresponding to positions where the exposed substrate portion, the first exposed insulator portion, and the second exposed insulator portion are exposed on the first side surface with respect to a direction that the first side surface and the second side surface are opposed.

* * * * *